(No Model.)
E. J. PAGAN.
DRAG ANCHOR.
No. 396,229.  Patented Jan. 15, 1889.
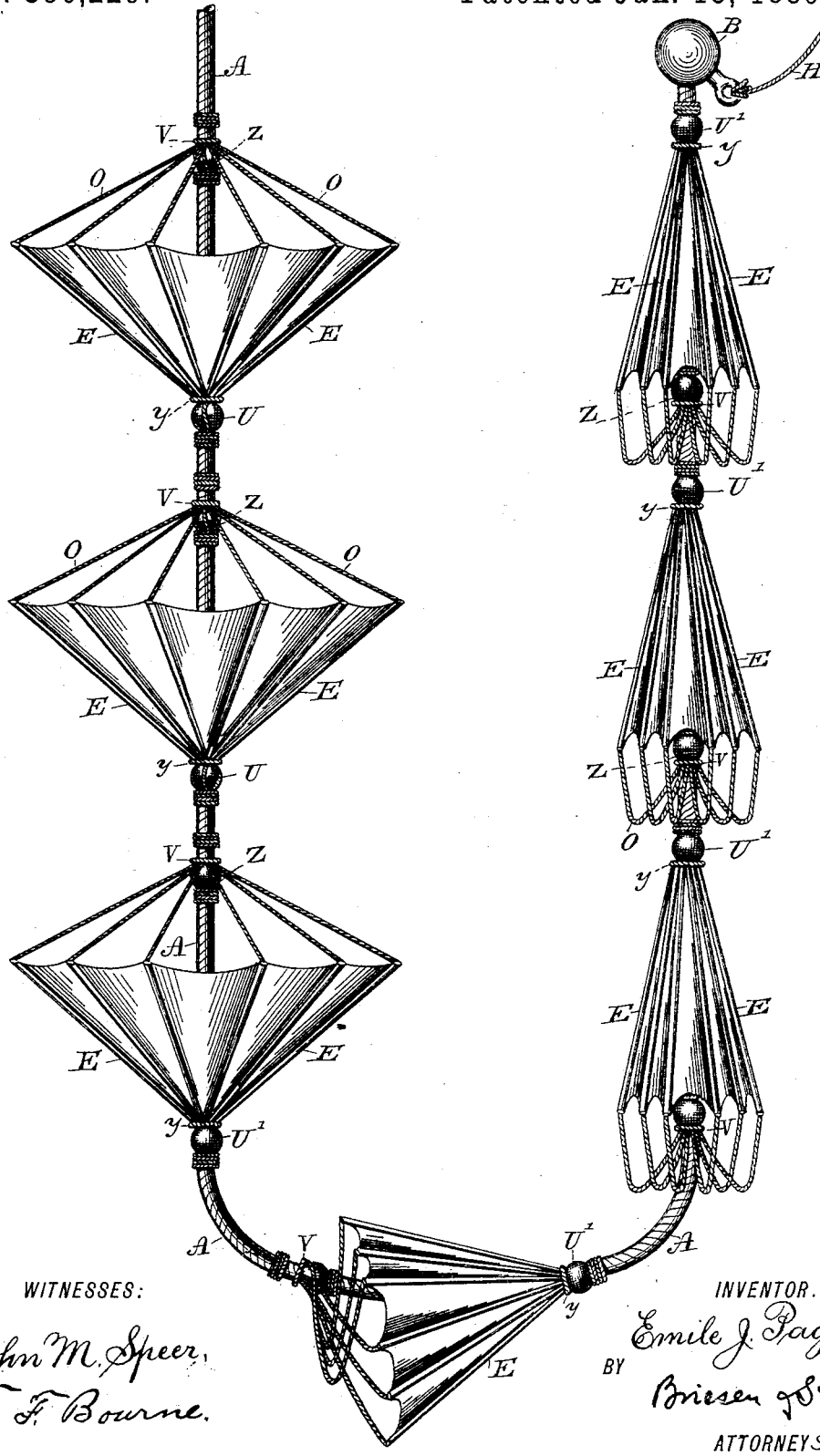
WITNESSES:
John M. Speer,
F. F. Bourne.
INVENTOR.
Emile J. Pagan
BY Briesen & Steele
ATTORNEYS

UNITED STATES PATENT OFFICE.

EMILE JEAN PAGAN, OF PARIS, FRANCE.

DRAG-ANCHOR.

SPECIFICATION forming part of Letters Patent No. 396,229, dated January 15, 1889.

Application filed March 23, 1888. Serial No. 268,308. (No model.) Patented in France January 8, 1887, No. 180,773; in Belgium January 21, 1887, No. 76,029, and in England February 4, 1887, No. 1,815.

*To all whom it may concern:*

Be it known that I, EMILE JEAN PAGAN, of the city of Paris, France, have invented new and useful Improvements in Drag-Anchors, of which the following is a full, clear, and exact description, and for which I have obtained Letters Patent in France, dated January 8, 1887, No. 180,773; in Belgium, dated January 21, 1887, No. 76,029, and in England, dated February 4, 1887, No. 1,815.

The present invention relates to improvements in drag-anchors which furnish means for anchoring or stopping vessels instantaneously by anchoring them in the water by the action of the water itself; and it consists, essentially, in a cable or chain provided with a convenient number of parachutes or concave surfaces fixed at convenient distances and contructed of canvas, leather, india-rubber, or any other convenient material of great flexibility and resistance. These parachutes or concave surfaces may be of any desired form—round, square, oval, rectangular, or otherwise—acoreding to circumstances, and have no mechanical joints whatever, nor slides of any sort, nor do they slide on rods, nor have hinges or joints of iron or sheet metal, nor rigid plates of metal or wood, nor rigid rods. In their construction only canvas, leather, or india-rubber, or any equivalent material is used, and everything is flexible—nothing rigid.

In order to explain more clearly the nature of my invention, I will describe the same with reference to the annexed drawing, showing a drag-anchor made according to my invention.

In the drawing, E E are the ribs, of wood or cane or any other suitable material, which, sewed to the material, fold up on the cable A by a ligature at *y*, held in position by a ball, U, fitted into the cable A A, the strands of which are placed into helicoidal grooves formed in the said ball or held in position by a specially-formed link in case the cable is replaced by a chain. The number of the ribs in the parachute or concave surface may vary according to circumstances, and they serve the same purpose as the ribs of an umbrella.

O O are cords or thin chains fixed to the cable by the ring V or otherwise, and also retained in position by a ball, Z, similar to U. Their other ends are fixed to the end of the ribs. These cords or chains, the number of which may vary, regulate by their length the opening of the parachutes or concave surfaces.

The cable or chain is provided at its end with a weight, B, so that it sinks quickly when immersed and causes the anchoring device to operate immediately. This weight has a ring, to which is attached a light but strong line, H, for the purpose of hauling the weight on board again.

The drawing represents a cable provided with seven parachutes or concave surfaces. The smallest cables will have generally two or three, while those for vessels of a great tonnage will have twenty or more of these parachutes, the diameter of which increases in proportion, and all fixed to the same cable or chain.

One part of the apparatus represented in the drawing is still in action, with opened parachutes, while the other part, with closed parachutes, has ceased to be so, being hauled up by the line H. In this second part of the apparatus the balls U' differ from the balls U, as they are provided with a central hole, into which passes the cable A. In this case cables provided with a metallic or other core may be employed. The disposition of these balls may, however, be varied without changing in any way the nature of my invention.

The cable is made fast to any suitable part of the vessel, according to the desired effect, and is folded and inclosed in a sack suspended overboard, either alongside or at the stern. This sack, hanging with its opening downward, is closed by a slide operated by a cord within reach of the helmsman, who only has to pull this cord to let go the cable and to stop the vessel instantaneously and without shock or jerk.

It is easy to understand that a cable or chain anchor of this description, being of great elasticity and flexibility in all its parts, will be very light and will be capable of an easy, simple, practical, and instantaneous manipulation, and will not be liable to get out of shape or out of order and fail, as might be the case if it were constructed with metal or other rigid rods, sleeves, joints, rigid ribs, metal or wooden plates, and the like.

This anchor will, in consequence of its instaneous stopping-power, prevent collisions in rivers and on the high seas. It will rapidly stop torpedo-boats, will permit a rapid tacking, and further assist in steering when the rudder is lost or broken. Lastly, it will permit vessels driven toward the coast to anchor in the water by the action of the water, thus preventing the vessel from wrecking or stranding.

If the elasticity of the several parts of the apparatus were not thought sufficient to avoid any shock when the cable-anchor is thrown overboard and open in the water, the cable or chain might be provided with any kind of springs or any other shock deadening or breaking device.

I claim—

1. In a drag-anchor, the flexible cable A, carrying a number of balls, combined with the parachutes E, having ribs that are secured to the cable at one end contiguous to said balls and with the flexible connections O, that are secured to said ribs and also to the cable contiguous to other balls, whereby the parachutes are held in position on the cable, substantially as described.

2. In a drag-anchor, the flexible cable A, combined with a series of parachutes, E, that are arranged along said cable, and with the separate weight B at the end of the cable, substantially as described.

The foregoing specification of improvements in drag-anchors signed by me this 5th day of March, 1888.

EMILE JEAN PAGAN.

Witnesses:
 ROBT. M. HOOPER,
 ALBERT MOREAU.